United States Patent [19]

Etter-Felix

[11] 4,058,009
[45] Nov. 15, 1977

[54] ARRANGEMENT FOR MONITORING PNEUMATIC TIRE INFLATION PRESSURE

[76] Inventor: Hansruedi Etter-Felix, Neuhaus, Egnach (Thurgau), Switzerland

[21] Appl. No.: 608,537

[22] Filed: Aug. 28, 1975

[51] Int. Cl.² .............................................. B60C 23/04
[52] U.S. Cl. .................................... 73/146.8; 137/277
[58] Field of Search ........................... 73/146.3, 146.8; 137/227, 226; 152/427, 415

[56] References Cited
U.S. PATENT DOCUMENTS

| 3,230,968 | 1/1966 | Struby | 73/146.8 |
| 3,717,030 | 2/1973 | McGhee | 73/146.3 |
| 3,937,077 | 2/1976 | Klamm | 73/146.8 |

FOREIGN PATENT DOCUMENTS 2,125,759  5/1972  Germany .............................. 152/415

Primary Examiner—Donald O. Woodiel
Attorney, Agent, or Firm—Michael J. Striker

[57] ABSTRACT

A cylinder accommodates an elongated bellows tube one end of which is connected to the cylinder and another end of which has a piston sealingly mounted in it so that the piston can move with the bellows tube during expansion and contraction of the latter. The piston in part bounds a pressure chamber in the cylinder outside the bellows tube and is urged to a position in which it closes the chamber. Channels communicate the chamber with one or more tires so that the piston is subject to the inflation pressure of the tire and shifts in the cylinder under concomitant change in the axial length of the bellows tube when changes in the tire inflation pressure occur.

10 Claims, 7 Drawing Figures

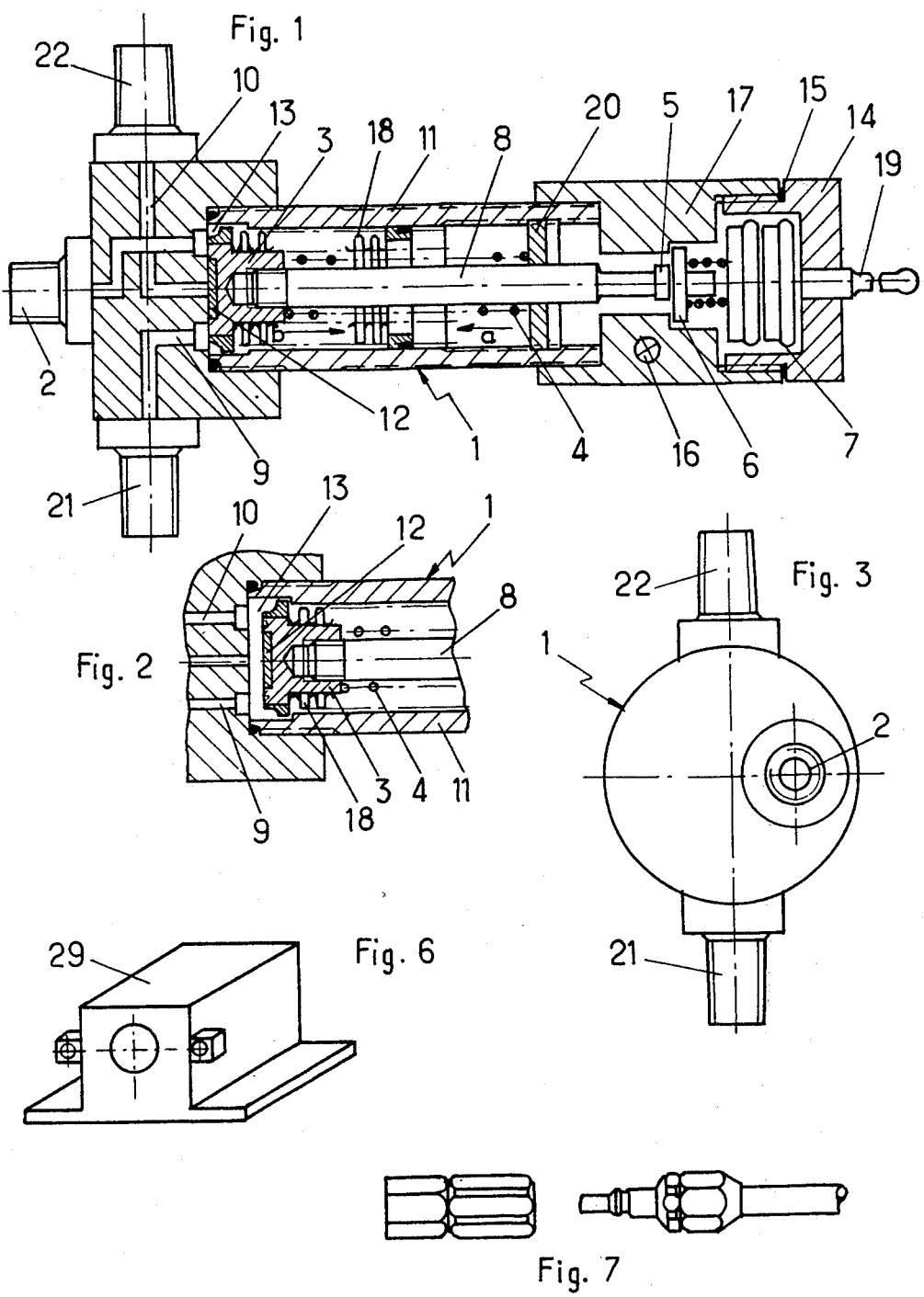

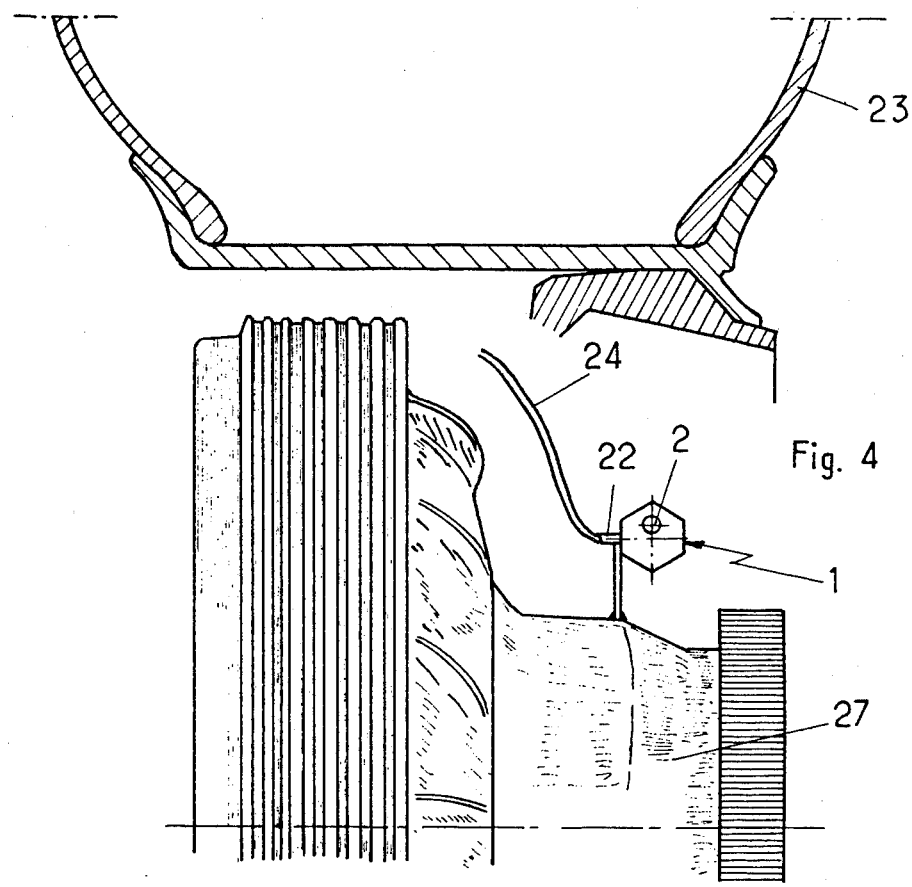
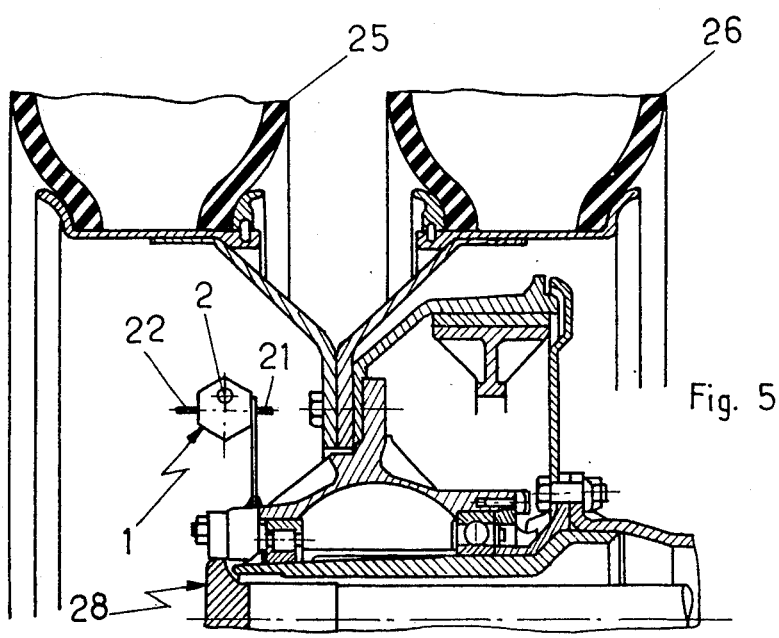

4,058,009

ARRANGEMENT FOR MONITORING PNEUMATIC TIRE INFLATION PRESSURE

BACKGROUND OF THE INVENTION

The present invention relates to an arrangement for monitoring pneumatic tire inflation pressures.

The invention is particularly suitable for monitoring the inflation of one or more tires, i.e. of one tire alone or of more than one tire simultaneously, and can be used with all types of pneumatic tires, for example those of trucks, trailers, buses, automobiles, aircraft and the like.

The monitoring of the inflation pressure of pneumatic tires in any of the aforementioned types of applications, and in others where pneumatic tires are used but have not been specifically mentioned, has long been desirable to avoid accidents or at least break-downs which may result in traffic tie-ups or the like. Nevertheless, heretofore no satisfactory arrangement for this purpose has become known.

SUMMARY OF THE INVENTION

It is, accordingly, a general object of this invention to provide such an arrangement.

More particularly, it is an object of the present invention to provide an arrangement for monitoring pneumatic tire inflation pressure which is both simple in its construction and highly reliable in its operation.

Another object of the invention is to provide such an arrangement which permits monitoring of the inflation pressure of a single tire or of more than one tire simultaneously.

An additional object of the invention is to provide such an arrangement that permits the simultaneous inflation to identical pressures of two or more tires whose pressure is to be monitored by the arrangement.

In keeping with these objects, and with others which will become apparent hereafter, one feature of the invention resides in an arrangement for monitoring pneumatic tire inflation pressure which, briefly stated, comprises a cylinder, an elongated bellows tube in the cylinder and having one end connected thereto and another end, and a piston which is sealably mounted in the other end and is movable with the bellows tube during expansion and contraction of the same. The piston in part bounds a pressure chamber outside the bellows tube. Channel means is provided for communicating the pressure chamber with a tire so that the piston is subject to the inflation pressure in the tire and shifts in the cylinder under concomitant change in the axial length of the bellows tube, in response to changes in the inflation pressure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic axial section through an arrangement according to the present invention for monitoring the pressure in a set of two tires;

FIG. 2 is a fragmentary axial section through the embodiment of FIG. 1, showing it in a different position;

FIG. 3 is an end view of FIG. 1;

FIG. 4 is a partly sectioned fragmentary view, illustrating an embodiment of the invention on conjunction with a single tire whose pressure is to be monitored;

FIG. 5 is a view similar to FIG. 4, but illustrating an embodiment of the invention in conjunction with dual tires whose pressure is to be monitored;

FIG. 6 is a perspective view of a HF receiver; and

FIG. 7 is a perspective view of a miniature coupling for air pressure lines.

DESCRIPTION OF THE PREFERRED EMBODIMENTS

Referring firstly to FIGS. 1–3 which show an exemplary embodiment of the invention, it will be seen that the arrangement 1 utilizes a cylinder 11 which may be of aluminum but could also be of any other non-magnetic or non-ferrous material. Located in the cylinder 11 is a bellows-shaped or accordian-pleated tube 18 which may be of rust-free steel or of another suitable material and which is provided at its right-hand end with a connection at 18a where it is fixedly and air tightly secured to the cylinder 11. The left-hand end of the tube 18 has mounted in it a piston 3. A rod 8 extends through the tube 18 and is connected with the piston 3 and a spring 4 surrounds the rod 8 within the tube 18 and bears upon the piston 3, the right-hand end of the spring 4 bearing upon a regulating screw or nut 20 which surrounds the rod 8 and is provided with an outer circumferential thread that meshes with interior threads in the cylinder 11. Thus, by turning the nut 20 in opposite direction, the spring 4 can be tensioned or relaxed. Access may be had to the nut 20 from the open right-hand end of the cylinder 11. The left-hand end of the piston 3 has inserted into it a sealing member 12.

The piston 3 with the sealing member 12 in part bounds a pressure chamber 13 which communicates with two channels 9 and 10 that lead to respective nipples 21 and 22. These nipples are each to be connected with a tire to be monitored, for example by means of fluid lines of copper or any other suitable metallic or synthetic plastic material. These fluid lines are connected with the valves of the tires via suitable coupling devices.

A sender or transmitter is screw threadedly secured on the cylinder 11 and yields via an antenna 19 a wireless signal which indicates that one or the other of the monitored tires has an air pressure that is below a predetermined limit. The transmitter is advantageously cast into a housing 17 that is completely sealed against ambient conditions and against impact damage, so that it has no components that are movable and are subject to damage due to ambient conditions or to wear. The transmitter is powered by batteries 7 which are removably accommodated in a cap 14 that is threaded onto the housing 17 via an interposed sealing ring 15, such as an O-ring, to prevent the entry of contaminants.

Before the housing 17 is threaded onto the cylinder 11, the nut 20 can be turned in the direction of the arrow *a* in order to tension the spring 4, thus increasing the pressure exerted upon the piston 3 and in the direction of the chamber 13. It is evident that this pressure could also be relaxed by turning the nut 20 in the opposite direction. The free end of the rod 8 carries a cap 5 of plastic or other electrically insulating material, in order to insulate it electrically with respect to the contact member 6. However, the rod can also be in its entirety of synthetic plastic material or another electrically non-conductive material.

FIG. 4 shows the arrangement 1 in use for supervising and monitoring a single pneumatic tire 23, with which it is connected via an airline 24. The arrangement 1 is mounted on the exterior of the brake drum 27 of a vehicle. This mounting is particularly suitable for trailers as long as the arrangement supervises and monitors only the pressure of a single tire.

FIG. 5, however, shows an embodiment where the arrangement 1 monitors the pressure of two tires 25 and 26 with which it is connected by not illustrated pneumatic lines that are connected with the channels 9 and 10. In this embodiment, the arrangement 1 is mounted on the hub 28 of the wheel.

To connect the pneumatic lines to the device 1 the nipples 21, 22 are provided which have internal valves that normally block the outflow of air and which are automatically opened when the fluid lines are connected with the respective nipples. When the fluid lines are disconnected the valves will automatically close, in known manner.

FIG. 7 shows a miniature coupling 70 which can replace the nipples and which operates in the same manner, i.e. being provided with a one-way internal valve (not shown).

The tires 25 and 26 which are being monitored can also be inflated, simultaneously and via the arrangement 1 for this purpose. For this purpose the arrangement 1 is provided with a nipple 2 having a one-way valve (not shown) incorporated in it; this nipple 2 can be connected with a pump or other suitable source of compressed air, and the air travels from the nipple 2 to the chamber 13 and from there via the passages or channels 9, 10 and the nipples 21, 22 to the tires 25 and 26, thereby causing the tires to be inflated at identical rates of pressure.

The pressure in chamber 13 corresponds to the pressure in the tires 25, 26 which are connected to the nipples 21, 22. As long as the desired pressure level which is set by compressing of the spring 4 via the nut 20, is maintained, the piston 3 is pushed in the direction of the arrow $b$ and an automatic pressure compensation between the tires 25 and 26 takes place via the channels 9, 10, as shown in FIG. 1. As soon as the pressure in one of the tires 25 or 26 drops, for example below 0.2 atmospheres, the components 12, 3, 8 and 18 move in the direction of the arrow $a$ under the influence of the biasing spring 4. This causes the free end of the rod 8 to axially retract and permits the contact member 6, which can also be springbiased as shown in FIG. 1, to move axially in direction of the arrow $a$ and to close the contact. This causes the illumination of a warning lamp 16 in the housing 17, either continuously or intermittently, indicating immediately which of the tires or which pair of tires is at a pressure below the preset limit. At the same time, the closing of the contact initiates the operation of the transmitter which yields a signal. The connection between the two passages 9, 10 is also at the time blocked by the fact that the sealing member 12 moves in sealing relationship over the open end of one or both of the passages 9, 10, and pressure equalization between the tires 25, 26 is terminated. Air can continue to leak out of the damaged tire, but the tire or tires will retain their minimum pressure since the possibility that air might leak out of the non-damaged tire or tires via the arrangement 1 into the damaged one and be lost therefrom, is precluded.

FIG. 6 shows a receiver R which can be employed to receive the wireless signal originating from the transmitter. Advantageously, the receiver R which is known per se and therefore requires no detailed discussion, is of such a type that it can be used both with 12 volt and 24 volt electrical systems for powering it, so that it can be employed in all types of vehicles. The receiver R is advantageously completely enclosed in a steel housing 29 which may be zinc coated, so that it is effectively protected against all external influences. The housing 29 can of course also be made of a different material and can have any desired shape. The receiver R may be mounted at the rear end of the loading platform of a tractor vehicle, for example if the arrangement 1 is mounted on a trailer being pulled by the tractor vehicle. The trailer then needs only to be provided with an antenna, for example in form of a wire, which is located within approximately 4–6 meters of the receiver R. Evidently, the receiver can also be mounted elsewhere, for example on the trailer itself or on different parts of the tractor vehicle. It is advantageous to lead a four-conductor cable from the receiver to the operator cabin, of which one conductor serves to supply electrical energy, one conductor is connected to mass, one conductor acts as an antenna and one conductor serves to transmit an alarm signal. It is advantageous if the receiver R is connected with the vehicle power source of 12 to 24 volts, for example via the ignition lock. When the ignition is switched on, the arrangement 1 is automatically also switched on, so that a control of the tire pressure is possible even when the vehicle is still standing still. The receiver R can also be so constructed that it can be connected to a different type of power source, for examle by interposing a transformer. An antenna can be arranged in form of a single wire that extends at both sides lengthwise of a gate, outlet, a pumping station or the like, and it can be mounted above or below ground. As soon as a vehicle having the arrangement 1 moves into the region of operability of a receiver connected with such an antenna and located at a location other than a vehicle, the receiver can receive a signal from the transmitter of the vehicle and can trigger an alarm at a desired location, for example in a police station, in a garage or the like.

The arrangement 1 according to the present invention can be provided on one or more wheels having single or double tires, and it can be used with or without remote signalling effect. It has the great advantage that the vehicle operator is timely warned when one or more of the tires lose pressure, so that such problems as overheating of tires, possibly leading to fires in the vehicle, accidents, breakdowns leading to traffic jams, and the like, can be avoided.

It will be understood that each of the elements described above, or two or more together, may also find a useful application in other types of constructions differing from the types described above.

While the invention has been illustrated and described as embodied in an arrangement for monitoring the inflation pressure of pneumatic tires, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for monitoring pneumatic tire inflation pressure, comprising a cylinder; an elongated bellows tube in said cylinder and having an end connected thereto and another end; a piston sealingly mounted in said other end and movable with said bellows tube during expansion and contraction of the same, said piston in part bounding a pressure chamber outside said bellows tube; and channel means for communicating said pressure chamber with a tire so that the piston is subject to the inflation pressure in the tire and shifts in said cylinder under concomittant change in the axial length of said bellows tube, in response to changes in the inflation pressure, said channel means including at least two channels each adapted to communicate with a different tire and each having an opening communicating with said pressure chamber, and said piston being movable to and from a position in which it blocks at least one of said openings.

2. An arrangement as defined in claim 1, wherein said piston is provided with a sealing element which overlies and seals said at least one opening when said piston moves to said position in response to the pressure in said chamber dropping below a predetermined level.

3. An arrangement as defined in claim 1; further comprising biasing means biasing said piston towards said position.

4. An arrangement as defined in claim 3, wherein said biasing means comprises a biasing spring.

5. An arrangement as defined in claim 3; and further comprising regulating means for regulating the biasing force exerted by said biasing means upon said piston.

6. An arrangement as defined in claim 1; and further comprising connecting means for connecting said chamber with a source of compressed air, so that all tires communicating with said channel means may be inflated simultaneously.

7. An arrangement as defined in claim 1; and further comprising lamp means operative for indicating the presence of pressure in excess of a predetermined limit in a tire connected with said channel means.

8. An arrangement for monitoring pneumatic tire inflation pressure, comprising a cylinder; an elongated bellows tube in said cylinder and having an end connected thereto and another end; a piston sealingly mounted in said other end and movable with said bellows tube during expansion and contraction of the same, said piston in part bounding a pressure chamber outside bellows tube; channel means for communicating said pressure chamber with a tire so that the piston is subject to the inflation pressure in the tire and shifts in said cylinder under concomitant change in the axial length of said bellows tube, in response to changes in the inflation pressure; a rod extending axially through said tube and having one end portion connected to said piston, and another end portion; biasing means biasing said piston toward said position; and regulating means for regulating the biasing force of said biasing means, comprising a threaded element surrounding said rod outside said tube and having external threads meshing with threads in said cylinder, said biasing means bearing upon said threaded element.

9. An arrnagement as defined in claim 8, wherein said threaded element is a nut.

10. An arrangement as defined in claim 8, wherein said threaded element is a nut which can be turned from outside said cylinder.

* * * * *